US008776046B2

(12) United States Patent
Gotou

(10) Patent No.: US 8,776,046 B2
(45) Date of Patent: Jul. 8, 2014

(54) RECORDING MEDIUM, COMPUTER PROGRAM AND METHOD FOR SOFTWARE INSTALLATION WITH DIVIDED INSTALL EXECUTION FILES

(75) Inventor: Hirotsugu Gotou, Musashino (JP)

(73) Assignee: Yokogawa Electric Corporation, Tokyo (JP)

( * ) Notice: Subject to any disclaimer, the term of this patent is extended or adjusted under 35 U.S.C. 154(b) by 1163 days.

(21) Appl. No.: 12/388,809

(22) Filed: Feb. 19, 2009

(65) Prior Publication Data

US 2009/0217261 A1    Aug. 27, 2009

(30) Foreign Application Priority Data

Feb. 22, 2008  (JP) .................................. 2008-041396

(51) Int. Cl.
    *G06F 9/445*    (2006.01)
(52) U.S. Cl.
    CPC ... *G06F 8/61* (2013.01); *G06F 8/60* (2013.01)
    USPC ............................. 717/175; 717/174; 717/177
(58) Field of Classification Search
    CPC ................ G06F 8/60; G06F 8/61; G06F 8/63
    USPC ............... 717/101–178; 714/38.13, E11.207;
                        713/2, 100; 726/22; 707/999.203
    See application file for complete search history.

(56) References Cited

U.S. PATENT DOCUMENTS

| 5,402,428 A * | 3/1995 | Kakuta et al. ................ 714/5.11 |
| 5,555,416 A * | 9/1996 | Owens et al. ................ 717/178 |
| 5,671,439 A * | 9/1997 | Klein et al. ........................ 710/1 |
| 5,875,456 A * | 2/1999 | Stallmo et al. ................ 711/114 |
| 6,282,711 B1 * | 8/2001 | Halpern et al. ............... 717/175 |
| 6,775,829 B1 * | 8/2004 | Kroening ....................... 717/175 |
| 6,802,061 B1 * | 10/2004 | Parthasarathy et al. ....... 717/173 |
| 6,922,831 B1 * | 7/2005 | Kroening et al. ............. 717/172 |
| 7,086,052 B2 * | 8/2006 | Mont et al. .................... 717/177 |
| 7,320,052 B2 * | 1/2008 | Zimmer et al. ............... 711/114 |
| 7,395,453 B2 * | 7/2008 | Cohen et al. .................... 714/27 |
| 7,774,774 B1 * | 8/2010 | Mulligan et al. .............. 717/174 |
| 7,861,241 B2 * | 12/2010 | Kumagai et al. .............. 717/174 |
| 7,870,550 B1 * | 1/2011 | Qureshi et al. ................ 717/174 |

(Continued)

FOREIGN PATENT DOCUMENTS

JP           10198569 A      7/1998

OTHER PUBLICATIONS

European Search Report, dated May 28, 2009.
European Search Report, dated Jun. 9, 2009.

*Primary Examiner* — Lewis A Bullock, Jr.
*Assistant Examiner* — Francisco Aponte
(74) *Attorney, Agent, or Firm* — Sughrue Mion, PLLC

(57) ABSTRACT n (where n is a natural number) divided software components divided from software to be installed are individually recorded in n recording mediums. Each of the second to n-th recording mediums from among the n recording mediums includes an install execution file that executes an install processing of a corresponding divided software component, an install assistant file that executes a run determination processing for determining whether or not the install of the divided software component recorded in the first recording medium is executed and when the install is not executed, runs the install execution file, and an autorun setup file that enables the install assistant file to be automatically run on an operating system.

9 Claims, 3 Drawing Sheets

(56) References Cited

U.S. PATENT DOCUMENTS

| | | | |
|---|---|---|---|
| 8,037,243 B1* | 10/2011 | Gasser et al. | 711/114 |
| 2002/0073411 A1* | 6/2002 | Tsunedomi et al. | 717/171 |
| 2005/0132353 A1* | 6/2005 | Chen | 717/174 |
| 2005/0188370 A1* | 8/2005 | Kouznetsov et al. | 717/174 |
| 2005/0240815 A1 | 10/2005 | Purkeypile et al. | |
| 2006/0047716 A1* | 3/2006 | Keith, Jr. | 707/203 |
| 2006/0184926 A1* | 8/2006 | Or et al. | 717/168 |
| 2006/0271825 A1* | 11/2006 | Keaffaber et al. | 714/38 |
| 2007/0011672 A1* | 1/2007 | Bhide et al. | 717/174 |
| 2007/0055973 A1* | 3/2007 | McKeeth | 717/174 |
| 2007/0240154 A1* | 10/2007 | Gerzymisch et al. | 717/174 |
| 2007/0245344 A1* | 10/2007 | Kumagai et al. | 717/174 |
| 2008/0127175 A1* | 5/2008 | Naranjo et al. | 717/174 |
| 2008/0244563 A1* | 10/2008 | Sonkin et al. | 717/175 |
| 2008/0313629 A1* | 12/2008 | Vetter et al. | 717/174 |
| 2009/0165133 A1* | 6/2009 | Hwang et al. | 726/22 |

* cited by examiner

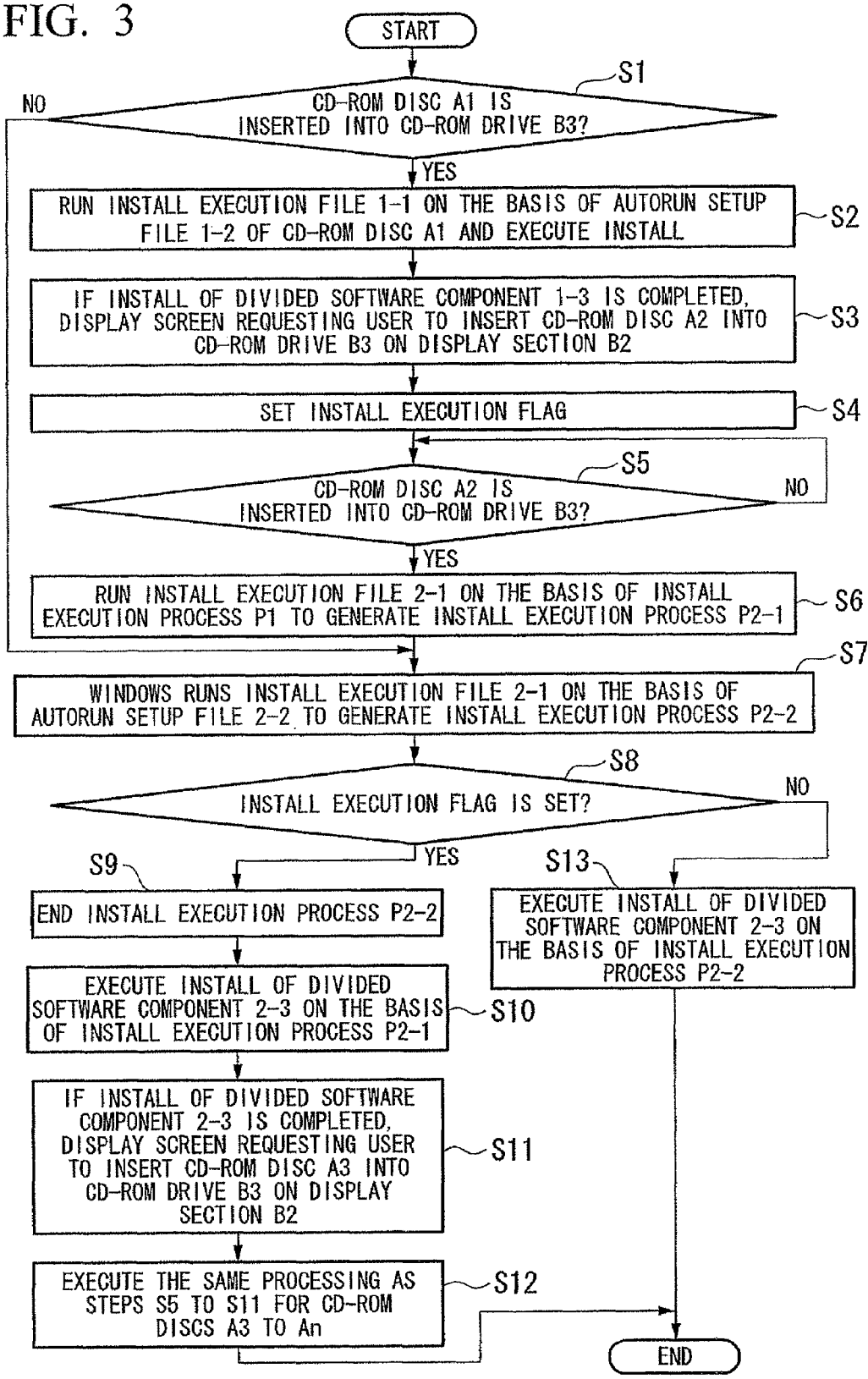

RECORDING MEDIUM, COMPUTER PROGRAM AND METHOD FOR SOFTWARE INSTALLATION WITH DIVIDED INSTALL EXECUTION FILES

BACKGROUND OF THE INVENTION

1. Field of the Invention

The present invention relates to a recording medium, an install method, and a computer program.

Priority is claimed on Japanese Patent Application No. 2008-041396, filed Feb. 22, 2008, the content of which is incorporated herein by reference.

2. Description of Related Art

Windows (Registered Trademark) is an example of a known operating system. In the case of Windows (Registered Trademark), when software (software to be installed) is installed on a computer from a recording medium, such as a compact disc read only memory (CD-ROM), an autorun setup file (Autorun.inf) and an install execution file (install.exe) are placed in the recording medium. The autorun setup file enables the install execution file to be automatically run on the computer having inserted thereinto the recording medium.

When software to be installed is massive and is not stored in a single recording medium, software to be installed is divided and stored in a plurality of recording mediums. In this case, an install execution file is placed in each of the recording mediums, and an autorun setup file is placed only in a recording medium (first recording medium) that should be initially installed.

An install method using such an autorun setup file and an install execution file is widely known. Although it is not necessary to specially illustrate documents, for example, Japanese Unexamined Patent Application Publication No. 10-198569 discloses a technology regarding the install of software.

When software to be installed, which is divided and stored in a plurality of recording mediums, is installed on the computer, a divided software component recorded in the first recording medium may not be installed, and a divided software component recorded in another recording medium (for example, a second recording medium) may be selectively installed. In such a case, since no autorun setup file is placed in the second recording medium, a user needs to manually run the install execution file in the second recording medium. The user may feel bothered when he/she manually run the install execution file.

SUMMARY OF THE INVENTION

The invention has been achieved in view of the above circumstances, or the drawbacks inherent in the related art. It is, therefore, an object of the invention to provide a recording medium, an install method, and a computer program capable of facilitating operation of installing on a computer a divided software component recorded in a recording medium other than a first recording medium from among a plurality of recording mediums storing divided software components.

A first aspect of the present invention is a recording medium that stores a software component included in software, the software being sequentially divided into first, second, . . . , and n-th (where n is a natural number) software components which are stored in first, second, . . . , and n-th recording medium, respectively. Each of the second to n-th recording mediums includes an install execution file that executes an install process of associated one of the second to n-th software components stored therewith in the recording medium, an install assistant file that executes a run determination process to determine whether or not the install process of the first software component stored in the first recording medium is executed, and runs the install execution file when the install process of the first software component is unexecuted, and an autorun setup file that sets the install assistant file to be automatically run by an operating system.

In the first aspect of the present invention, the install assistant file may be integrated with the install execution file and/or the autorun setup file.

A second aspect of the present invention is a install method of software component included in software stored in a recording medium, the software being sequentially divided into first, second, . . . , and n-th (where n is a natural number) software components which are stored in first, second, . . . , and n-th recording medium, respectively. The install method of each of the second to n-th software components includes executing an install process of associated one of the second to n-th software components stored in the second to n-th recording medium, setting an operating system (OS) to automatically run a run determination process, setting the run determination process automatically run by the OS to determine whether or not the install process of the first software component stored in the first recording medium is executed, and executing the install process when the install process of the first software component is unexecuted.

In the second aspect of the present invention, each of individual files may be programmed as executing the install process of associated one of the second to n-th software components stored in the second to n-th recording medium, setting the OS to automatically run the run determination process, setting the run determination process automatically run by the OS to determine whether or not the install process of the first software component stored in the first recording medium is executed, and executing the install process when the install process of the first software component is unexecuted.

A third aspect of the present invention is a computer program that is stored in a computer readable medium and installs n-divided software components (where n is a natural number) divided from software to be installed on a computer, in which when each of second to n-th components among from the n-divided software components is installed, the computer program automatically runs a run determination process to determine whether or not a first component of the n-divided software components is installed, and runs an install process of each of the second to n-th divided software components except when the first component is installed.

BRIEF DESCRIPTION OF THE DRAWINGS

FIG. 3 is a flowchart that shows an install process to be executed by a notebook type personal computer B on the basis of various files stored in the CD-ROM discs A1 to An according to the embodiment of the present invention.

DETAILED DESCRIPTION OF THE INVENTION

Hereinafter, an embodiment of the present invention will be described with reference to the drawings. This embodiment relates to recording mediums.

Figure 1:
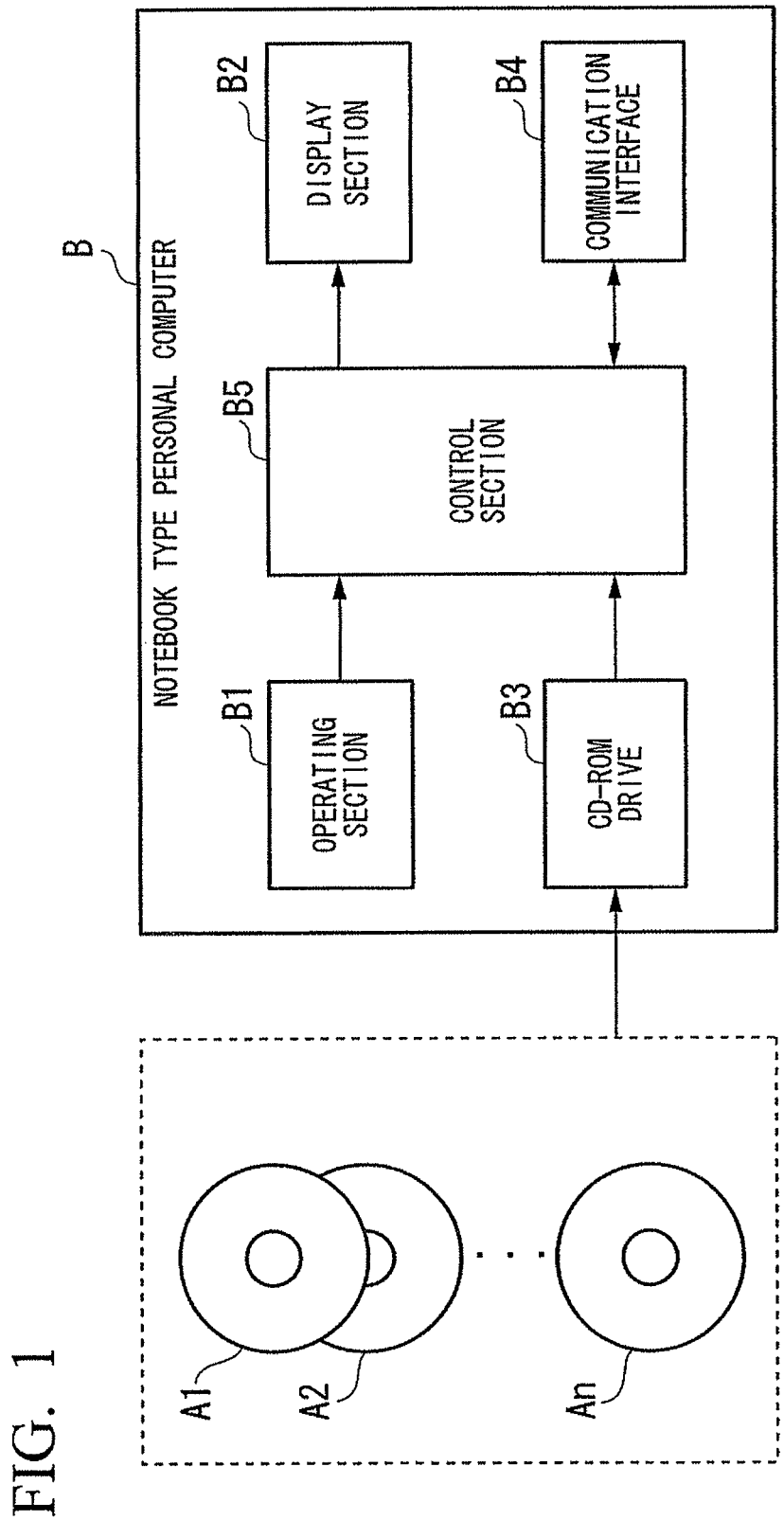
FIG. 1 is a schematic diagram that shows a configuration of an install system including CD-ROM discs A1 to An according to an embodiment of the present invention.
Figure 2:
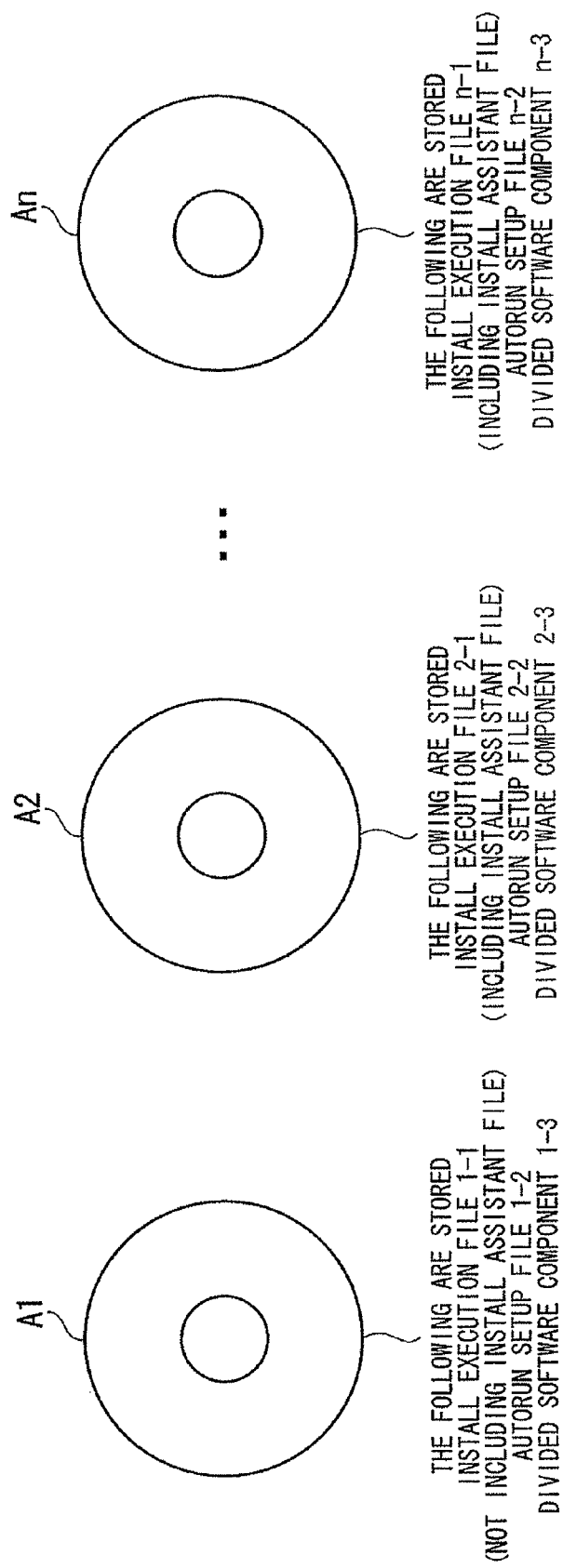
FIG. 2 is a schematic diagram that shows the CD-ROM discs A1 to An storing various files according to the embodiment of the present invention.

FIG. 1 is a schematic diagram that shows a configuration of an install system including CD-ROM discs A1 to An according to this embodiment of the present invention. FIG. 2 is a schematic diagram that shows the CD-ROM discs A1 to An storing various files according to this embodiment of the present invention. The CD-ROM discs A1 to An are recording mediums in this embodiment. As shown in FIG. 1, the install system includes the CD-ROM discs At to An and a notebook type personal computer B.

The CD-ROM discs A1 to An are recording mediums in which various kinds of control application software for field device control to be installed on the notebook type personal computer B are divided and recorded. Divided software components of application software for field device control are recorded in the CD-ROM discs A1 to An. The CD-ROM discs A1 to An are allocated with disc numbers, which are identical to reference symbols. The divided software components are installed on the notebook type personal computer B in sequence of the disc numbers of the CD-ROM discs A1 to An, such that various applications for field device control are all installed on the notebook type personal computer B.

During the install of various applications for field device control at the first time, when all of the divided software components have not been installed yet, the notebook type personal computer B may subsequently add a desired divided software component by the install using one of the CD-ROM discs A1 to An. Various applications for field device control are programs that execute control processing, such as parameter settings and the like, for field devices based on a communication standard, such as highway addressable remote transducer (HART; Registered Trademark), FOUNDATION fieldbus-H1 (FF-H1), or the like.

The notebook type personal computer B is a computer for control that is used to control various field devices, and includes an operating section B1, a display section B2, a CD-ROM drive B3, a communication interface B4, and a control section B5. The operating section B1 includes a keyboard and a mouse that receive an operation instruction from a user. The display section B2 is a liquid crystal display that displays various screens under control of the control section B5. The CD-ROM drive B3 reads out data recorded in a CD-ROM disc inserted thereinto and outputs data to the control section B5 on the basis of an instruction of the control section B5.

The communication interface B4 is an interface based on the communication standard, such as HART or FF-H1. The communication interface B4 is connected to various field devices through a communication network, and transmits/receives various signals with respect to the field devices on the basis of the instruction of the control section B5. The control section B5 includes a central processing unit (CPU), a read only memory (ROM), and a random access memory (RAM). The control section B5 controls the entire operation of the notebook type personal computer B on the basis of an operation instruction received by the operating section B1, data read by the CD-ROM drive B3 from a CD-ROM disc, and a signal received by the communication interface B4.

When the applications for field device control are installed, the notebook type personal computer B can execute various kinds of control processing on the field devices according to an operation instruction of the user. The notebook type personal computer B has Windows (Registered Trademark) in the control section B5 as an operating system (OS), and the applications for field device control are executed on Windows (Registered Trademark).

Next, files to be recorded in the CD-ROM discs A1 to An will be described in detail with reference to FIG. 2. As shown in FIG. 2, install execution files 1-1 to n-1, autorun setup files 1-2 to n-2, and divided software components 1-3 to n-3 are individually recorded in the CD-ROM discs A1 to An.

Each of the install execution files 1-1 to n-1 is a program file that executes the install processing (install execution processing) for each of the divided software components 1-3 to n-3 recorded in the same CD-ROM disc, and is described in a machine language. Each of the install execution files 1-1 to n-1 is integrated with an install assistant file of the present invention, and includes run determination processing that determines whether or not to run the install execution processing.

Each of the autorun setup files 1-2 to n-2 is a setup file for install in which settings regarding autorun corresponding to each of the install execution files 1-1 to n-1 recorded in the same CD-ROM disc are described in a text format. The file name of the autorun setup file is "Autorun" and the extension of the autorun setup file is ".inf". In the case of Windows (Registered Trademark), when "Autorun.inf" is recorded in a CD-ROM disc inserted into the CD-ROM drive B3, a file which is described in the settings of "Autorun.inf" is automatically run.

The divided software components 1-3 to n-3 include execution files included in various applications for field device control, dynamic link library (DLL) files, initialize (INI) files, databases of various field devices, and the like.

Next an install processing to be executed by the notebook type personal computer B on the basis of files recorded in the CD-ROM discs A1 to An will be described in detail with reference to FIG. 3. FIG. 3 is a flowchart that shows an install processing to be executed by the notebook type personal computer B on the basis of various files recorded in the CD-ROM discs A1 to An of this embodiment of the present invention.

The control section B5 of the notebook type personal computer B determines whether or not the CD-ROM disc A1 is inserted into the CD-ROM drive B3 (Step S1). In Step S1, if the result is determined to be "YES", that is, if the CD-ROM disc A1 is inserted into the CD-ROM drive B3, the control section B5 runs the install execution file 1-1 on the basis of the autorun setup file 1-2 of the CD-ROM disc A1, to thereby generate an install execution process P1. The install of the divided software component 1-3 is executed on the basis of the install execution process P1 (Step S2).

If the install of the divided software component 1-3 is completed, the control section B5 controls the display section B2 to display a screen requesting the user to insert the CD-ROM disc A2 into the CD-ROM drive B3 on the basis of the install execution process P1 (Step S3). The control section B5 sets, in a shared memory area of each process to be managed by Windows (Registered Trademark), a flag (install execution flag) indicating that the install is executed from the CD-ROM disc A1 (Step S4). The control section B5 determines whether or not the CD-ROM disc A2 is inserted into the CD-ROM drive B3 (Step S5). In Step S5, if the result is determined to be "NO", that is, if the CD-ROM disc A2 is not inserted into the CD-ROM drive B3, it waits until the CD-ROM disc A2 is inserted into the CD-ROM drive B3.

In Step S5, if the result is determined to be "YES", that is, if the CD-ROM disc A2 is inserted into the CD-ROM drive B3, the control section B5 runs the install execution file 2-1 of the CD-ROM disc A2 on the basis of the install execution process P1, to thereby generate an install execution process P2-1 (Step S6), the control section B5 runs the install execution file 2-1 on Windows (Registered Trademark) on the basis of the autorun setup file 2-2 of the CD-ROM disc A2, to thereby generate an install execution process P2-2 (Step S7).

In Step S1, if the result is determined to be "NO", that is, if a disc other than the CD-ROM disc A1, for example, the CD-ROM disc A2 is inserted into the CD-ROM drive B3, the control section 35 progresses to Step S7.

After Step S7, the control section B5 determines on the basis of the run determination process in the install execution process P2-2 whether or not the install execution flag is set in the shared memory area of each process managed by Windows (Registered Trademark) (Step S8). In Step S8, if the result is determined to be "YES", that is, if the install execution flag is set, while the install execution processing in the install execution process P2-2 is not executed, the install execution process P2-2 ends (Step S9), and the install of the divided software component 2-3 is executed on the basis of an install execution processing of the install execution process P2-1 (Step S10).

If the install of the divided software component 2-3 is completed, the control section B5 controls the display section B2 to display a screen requesting the user to insert the CD-ROM disc A3 into the CD-ROM drive B3 on the basis of the install execution process P2-1 (Step S11). Thereafter, the control section B5 executes the same processing of Steps S5 to S11 for the CD-ROM discs A3 to An (Step S12). In Step S8, if the result is determined to be "NO", that is, if the install execution flag is not set, the control section B5 executes the install of the divided software component 2-3 on the basis of an install execution processing of the install execution process P2-2 (Step S13).

As described above, the autorun setup files 2-1 to n-2 automatically running the install execution files 1-1 to n-1 are recorded in the CD-ROM discs A1 to An. For this reason, during the install using each of the CD-ROM discs A1 to An, each of the install execution files 1-1 to n-1 is automatically run. Therefore, it is not necessary for the user to manually run each of the install execution files 1-1 to n-1 of the CD-ROM discs A1 to An, and thus the user does not feel bothered.

In addition, each of the install execution files 2-1 to n-1 integrated with the install assistant file of the present invention individually recorded in the CD-ROM discs A2 to An includes run determination processing. For this reason, a problem occurring when the autorun setup files 2-2 to n-2 are individually recorded in the CD-ROM discs A2 to An, that is, a problem that the install execution process P1 and each of the install execution files 2-1 to n-1 run by the autorun setup files are run together when the install is executed from the CD-ROM disc A1, is eliminated by ending one of the install execution process P1 and the install execution file before the install execution processing is executed (refer to Step S9 shown in FIG. 3).

Although an embodiment of the present invention has been described, the present invention is not limited to the foregoing embodiment, and the following modifications may be made.

Although in the foregoing embodiment, the install execution file, the autorun setup file, and the divided software component are recorded in a CD-ROM disc, the present invention is not limited thereto.

For example, the install execution file, the autorun setup file, and the divided software component may be recorded in a recording medium, such as a DVD-ROM disc or a semiconductor memory, other than a CD-ROM disc.

On the other hand, although in the foregoing embodiment, each of the install execution files 2-1 to n-1 is integrated with the install assistant file of the present invention, the invention is not limited thereto.

An install assistant file including a run determination processing and install execution files 2-1 to n-1 may be separate program files, and settings regarding autorun of the install assistant files may be described in the autorun setup files, thereby implementing the same processing as the flowchart of FIG. 3.

Furthermore, although in the foregoing embodiment, when the install is executed from the CD-ROM disc A1, the control section B5 installs the divided software component 2-3 by the install execution process P2-1 or P2-2 based on the install execution file 2-1 of the CD-ROM disc A2, the invention is not limited thereto.

For example, when the install is executed from the CD-ROM disc A1, the divided software component 2-3 may be installed by the install execution process P2-1 based on the install execution file 1-1 of the CD-ROM disc A1. On the contrary, in the case of install of only the CD-ROM disc A2, the divided software component 2-3 may be installed by a process based on the install execution file 2-1 of the CD-ROM disc A2.

According to the embodiment of the present invention, the second to n-th recording mediums each includes
the install execution file that executes the install processing of the divided software component,
the install assistant file that executes the run determination processing that determines whether or not the install of the divided software component recorded in the first recording medium is executed and when the install is not executed, for running the install execution file, and the autorun setup file that enables the install assistant file automatically run on the OS. Therefore, during the install of one of the second to n-th recording mediums, the install execution file is automatically run, and as a result, it is not necessary for the user to manually run the install execution file.

What is claimed is:

1. A non-transitory recording medium that is classified into one of first to n-th non-transitory recording mediums, wherein
each of the first to n-th non-transitory recording mediums stores:
one of first to n-th software components that software is sequentially divided into; and
one of first to n-th installation execution files each of which generates an installation process of associated one of the first to n-th software components and executes the installation process,
each of the second to n-th non-transitory recording mediums further stores:
one of second to n-th installation assistant files each of which runs one of the second to n-th installation execution files from one of the second to n-th non-transitory recording mediums; and
one of second to n-th autorun setup files each of which sets one of the second to n-th installation assistant files to be automatically run by an operating system,
each of the second to n-th installation assistant files is integrated with one of the second to n-th installation execution files that is stored in the same non-transitory recording medium as the respective installation assistant files,
if the installation process for the first software component stored in the first recording medium is not completed, an installation is done of one of the second to n-th software components stored in one of the second to n-th non-transitory recording mediums, the installation is done by executing one of installation processes for the second to n-th software components, the installation processes are generated by the second to n-th installation execution files, the second to n-th installation execution files are run by the second to n-th installation assistant files, and the installation assistant files are automatically run by the second to n-th autorun setup files, and if the installation process for the first software component stored in the first recording medium is completed, an installation is done of one of the second to n-th software components stored in one of the second to n-th non-transitory recording mediums, the installation is done by ending one of a first installation process and a second installation process and executing the other of the first installation process and the second installation process, the first installation process is one of first type of installation processes for the second to n-th software components, the first type of installation processes are generated by the second to n-th installation execution files which have been run by an installation process for the first software component, the second installation process is one of second type of installation processes for the second to n-th software components, the second type of installation processes are generated by the second to n-th installation execution files which have been run by the second to n-th installation assistant files, and the installation assistant files had been automatically run by the second to n-th autorun setup files.

2. The non-transitory recording medium according to claim 1, wherein each of the second to n-th installation assistant files is integrated with one of the second to n-th autorun setup files that is stored in the same non-transitory recording medium as the respective installation assistant files.

3. The non-transitory recording medium according to claim 1, wherein each of the first to n-th installation execution file is a program file that executes the installation process for each of the first to n-th software components recorded in the same CD-ROM disc, the installation process being described in a machine language.

4. The non-transitory recording medium according to claim 1, wherein each of the second to n-th autorun setup files is a setup file for installation in which settings regarding autorun corresponding to one of the second to n-th installation execution files recorded in the same CD-ROM disc are described in a text format.

5. The non-transitory recording medium according to claim 1, wherein each of the first to n-th software components includes execution files included in various applications for field device control, dynamic link library (DLL) files, initialize (INI) files, and databases of various field devices.

6. An installation method for installing first to n-th software components that software is sequentially divided into, the first to n-th software components being respectively stored in first to n-th non-transitory recording mediums, the installation method comprising:

a first step of generating an installation process of at least one of the first to n-th software components using one of first to n-th installation execution files stored in the first to n-th non-transitory recording mediums and executing the installation process;

a second step of determining whether or not the installation process of the first software component stored in the first non-transitory recording medium is completed using one of second to n-th installation assistant files stored in the second to n-th non-transitory recording mediums, and each of the second to n-th installation assistant files is integrated with one of the second to n-th installation execution files that is stored in the same non-transitory recording medium as the respective installation assistant files; and a third step of setting an operating system (OS) to automatically run the second step using one of second to n-th autorun setup files stored in the second to n-th non-transitory recording mediums, wherein if the installation process for the software component stored in the first recording medium is not completed, an installation is done of one of the second to n-th software components stored in one of the second to n-th non-transitory recording mediums, the installation is done by executing one of installation processes for the second to n-th software components, the installation processes are generated by the second to n-th installation execution files, the second to n-th installation execution files are run by the second to n-th installation assistant files, and the installation assistant files automatically run by the second to n-th autorun setup files, and if the installation process software component stored in the first recording medium is completed, an installation is done of one of the second to n-th software components stored in one of the second to n-th non-transitory recording mediums, the installation is done by ending one of a first installation process and a second installation process and executing the other of the first installation process and the second installation process, the first installation process is one of first type of installation processes for the second to n-th software components, the first type of installation processes are generated by the second to n-th installation execution files which have been run by an installation process for the first software component, the second installation process is one of second type of installation processes for the second to n-th software components, the second type of installation processes are generated by the second to n-th installation execution files which have been run by the second to n-th installation assistant files, and the installation assistant files had been automatically run by the second to n-th autorun setup files.

7. The installation method according to claim 6, wherein the first step, the second step and the third step are stored in different files from each other.

8. The installation method according to claim 6, wherein each of the first to n-th software components includes execution files included in various applications for field device control, dynamic link library (DLL) files, initialize (INI) files, and databases of various field devices.

9. A non-transitory computer program product comprising a non-transitory computer readable medium having a computer program to be executed by a computer, the computer program installing first to n-th software components that software is sequentially divided into, wherein the computer program includes:

first to n-th installation execution files each of which generates an installation process of associated one of the first to n-th software components and executes the installation process;

second to n-th installation assistant files each of which runs one of the second to n-th installation execution files; and second to n-th at run setup files each of which sets one of the second to n-th installation assistant files to be automatically run by an operating system, each of the second to n-th installation assistant files is integrated with one of the second to n-th installation execution files, respectively, if the installation process for the first software component is not completed, an installation is done of one of the second to n-th software components, the installation is done by executing one of installation processes for the second to n-th software components, the installation processes are generated by the second to n-th installation execution files, the second to n-th installation execution files are run by the second to n-th installation assistant files, and the installation assistant files are automatically run by the second to n-th autorun setup files, and if the installation process for the first software component is completed, an installation is done of one of the second to n-th software components, the installation is done by ending one of a first installation process and a second installation process and executing the other of the first installation process and the second installation process, the first installation process is one of first type of installation processes for the second to n-th software components, the first type of installation processes are generated by the second to n-th installation execution files which have been run by an installation process for the first software component, the second installation process is one of second type of installation processes for the second to n-th software components, the second type of installation processes are generated by the second to n-th installation execution files which have been run by the second to n-th installation assistant files, and the installation assistant files had been automatically run by the second to n-th autorun setup files.

* * * * *